(12) United States Patent
Bouten (10) Patent No.: US 8,567,758 B2
(45) Date of Patent: Oct. 29, 2013

(54) DOUBLE SOLENOID VALVE

(75) Inventor: Petrus Henricus Johannes Bouten, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 229 days.

(21) Appl. No.: 12/858,875

(22) Filed: Aug. 18, 2010

(65) Prior Publication Data

US 2012/0043486 A1 Feb. 23, 2012

(51) Int. Cl.
*F16K 31/02* (2006.01)

(52) U.S. Cl.
USPC ............. 251/129.1; 251/129.07; 251/50; 251/282; 251/297

(58) Field of Classification Search
USPC ........ 251/129.1, 129.07, 282, 318, 297, 324, 251/319, 48, 50
See application file for complete search history.

(56) References Cited

U.S. PATENT DOCUMENTS

| | | | | |
|---|---|---|---|---|
| 1,819,452 A * | 8/1931 | Wright | ............... | 251/129.1 |
| 3,602,245 A * | 8/1971 | Meisel | ............... | 137/270 |
| 3,701,366 A * | 10/1972 | Tirelli et al. | ............... | 137/625.65 |
| 3,791,408 A * | 2/1974 | Saitou et al. | ............... | 137/529 |
| 4,185,661 A * | 1/1980 | Gill et al. | ............... | 137/625.65 |
| 4,353,394 A * | 10/1982 | Loup | ............... | 137/625.65 |
| 4,355,660 A * | 10/1982 | Huffman | ............... | 137/625.63 |
| 4,522,373 A * | 6/1985 | Shelbourn et al. | ............... | 251/297 |
| 4,634,096 A * | 1/1987 | Hara | ............... | 251/129.15 |
| 4,643,225 A * | 2/1987 | Imhof | ............... | 137/596.17 |
| 4,690,171 A * | 9/1987 | Johnston | ............... | 137/877 |
| 4,770,389 A * | 9/1988 | Bodine et al. | ............... | 251/129.1 |
| 4,793,591 A * | 12/1988 | Decker et al. | ............... | 251/172 |
| 4,796,860 A * | 1/1989 | Diel | ............... | 251/297 |
| 4,844,412 A * | 7/1989 | Kubozono | ............... | 251/297 |
| 4,946,130 A * | 8/1990 | Kooiman | ............... | 251/95 |
| 5,251,671 A * | 10/1993 | Hiroki | ............... | 137/625.65 |
| 5,375,625 A * | 12/1994 | Reynolds | ............... | 137/625.69 |
| 5,598,871 A * | 2/1997 | Sturman et al. | ............... | 137/625.65 |
| 5,640,987 A * | 6/1997 | Sturman | ............... | 137/1 |
| 5,653,421 A * | 8/1997 | Ellzey | ............... | 251/129.1 |
| 5,937,904 A * | 8/1999 | Wunder | ............... | 137/625.65 |
| 5,992,821 A * | 11/1999 | Rookes et al. | ............... | 251/129.1 |
| 6,006,783 A * | 12/1999 | Luhmann et al. | ............... | 137/625.65 |
| 6,170,524 B1 * | 1/2001 | Gray, Jr. | ............... | 137/625.18 |
| 6,672,565 B2 * | 1/2004 | Russell | ............... | 251/297 |
| 7,243,899 B2 * | 7/2007 | Acar et al. | ............... | 251/129.07 |
| 2001/0037831 A1 * | 11/2001 | Venditti et al. | ............... | 137/625.69 |
| 2004/0206922 A1 * | 10/2004 | Du Plessis et al. | ............... | 251/129.06 |

\* cited by examiner

*Primary Examiner* — Eric Keasel
*Assistant Examiner* — Minh Le

(57) ABSTRACT

A valve may include a valve body, a valve spool, and a valve actuator arrangement. The valve body may comprise a bore and a first and a second passage to the bore. The valve spool may comprise a first end and a second end and be at least partially positioned and slidable within the bore. The valve spool may comprise a first and a second sealing region in sealing contact with the bore. A first chamber may be comprised, at least in part, between the bore and the valve spool at the first end. A second chamber may be comprised, at least in part, between the bore and the valve spool and between the first and the second sealing regions. A third chamber may be comprised, at least in part, between the bore and the valve spool at the second end. A third passage connects the first and the third chambers. The first and the second passages are both open to the second chamber when the valve is at an open position. One and/or both of the first and the second passages are closed to the second chamber when the valve is at a closed position. In certain embodiments, no power is supplied to the valve at the open position and/or the closed position, and momentary loads, applied by solenoids of the valve actuator arrangement, move the valve spool between the open and the closed positions.

19 Claims, 5 Drawing Sheets

DOUBLE SOLENOID VALVE

BACKGROUND

Valves that turn on, turn off, and otherwise control fluid flow are presently known. The valves may be adapted to attach to plumbing and thereby control the fluid flow in the plumbing. The valves may be electrically actuated and thereby be controlled at a distance from the valve. The valves may comprise solenoids for the purpose of the electrical actuation.

SUMMARY

Consistent with embodiments of the present disclosure, a valve, adapted for use in fluid control, is disclosed. The valve may include a valve body, a valve spool, and a valve actuator arrangement.

The valve body may comprise a bore that defines an axis. The valve body may comprise a first passage open to the bore and a second passage also open to the bore. A valve spool may be at least partially positioned within the bore of the valve body and be slidable along the axis of the bore. A valve actuator arrangement may be adapted to apply a first load on the valve spool to move the valve spool to a closed position and may be adapted to apply a second load on the valve spool to move the valve spool to an open position. In certain embodiments, a first chamber may be comprised, at least in part, between the bore of the valve body and the valve spool, and a second chamber may be comprised, at least in part, between the bore of the valve body and the valve spool. A passage may connect the first chamber to the second chamber. In certain embodiments, the valve may be unpowered when at the closed position and at the open position. In certain embodiments, the valve actuator arrangement may comprise one and/or more solenoids to power the valve when switching between the closed position and the open position.

It is to be understood that both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same and/or similar elements. While embodiments of the invention may be described, modifications, adaptations, and other implementations are possible. For example, substitutions, additions, and/or modifications may be made to the elements illustrated in the drawings, and the methods described herein may be modified by substituting, reordering, and/or adding stages to the disclosed methods. Accordingly, the following detailed description does not limit the invention. Instead, the proper scope of the invention is defined by the appended claims.

A valve 20 that may be adapted for controlling a flow of various fluids 22 is disclosed. The fluids 22 that may be controlled by the valve 20 may include gasses, liquids, plasmas, fluid-like powders, and mixed phase fluids. The fluids 22 may include particles (e.g., suspended particles in the fluid). The fluids 22 may include Newtonian fluids, non-Newtonian fluids, viscoelastic fluids, and other types of fluids. The valve 20 may include a valve body 50, a valve spool 80, and a valve actuator arrangement 180. FIGS. 1-7 depict an example embodiment of the valve 20. As depicted at the figures, the valve 20 may be configured in an open configuration (see FIG. 3), with the valve spool 80 set to an open position 252, and a closed configuration (see FIG. 4), with the valve spool 80 set to a closed position 250.

Figure 7:
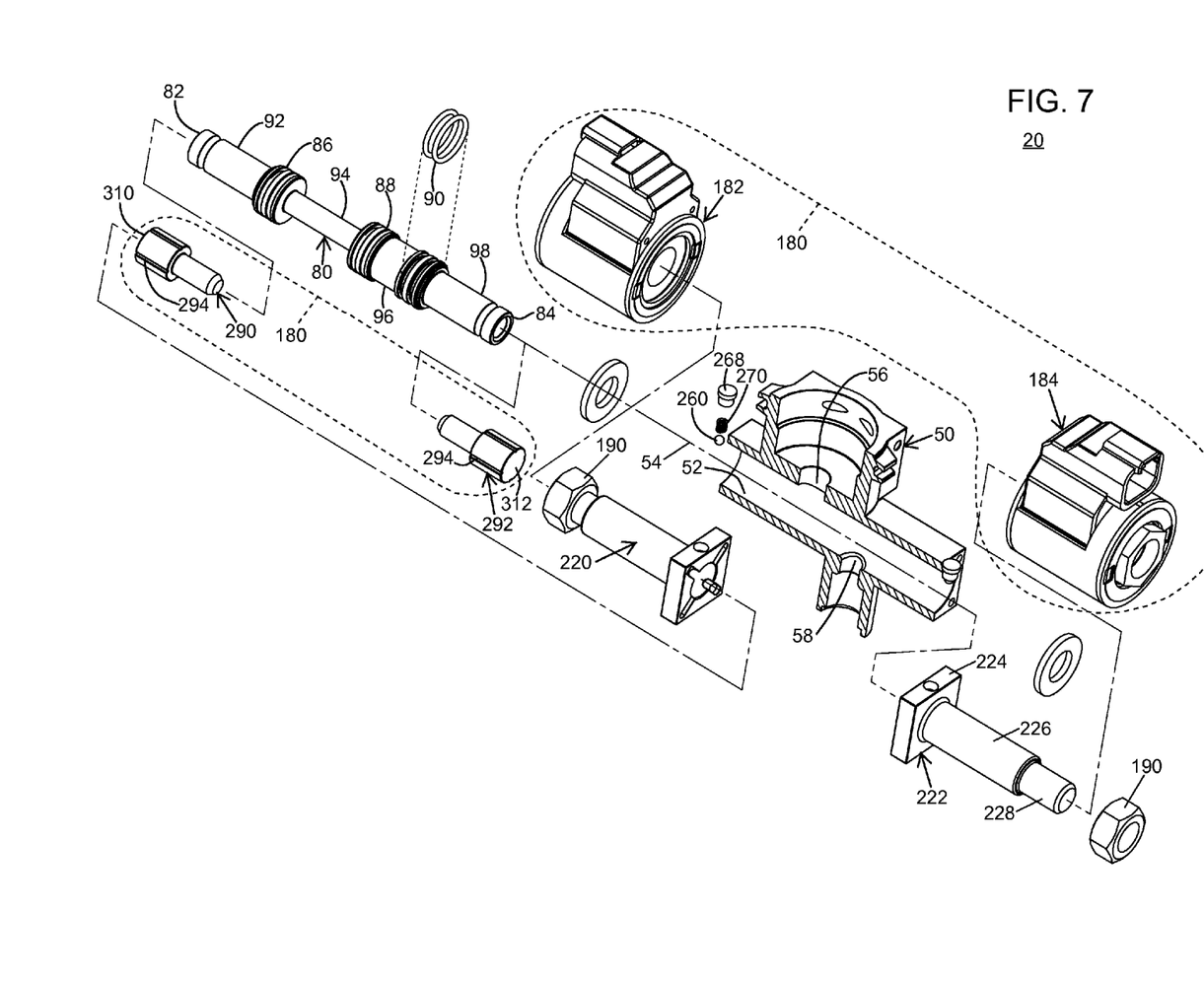
FIG. 7 is an exploded perspective view of the valve of FIG. 1 with the valve body of FIG. 6 in cross-section.
Figure 8:
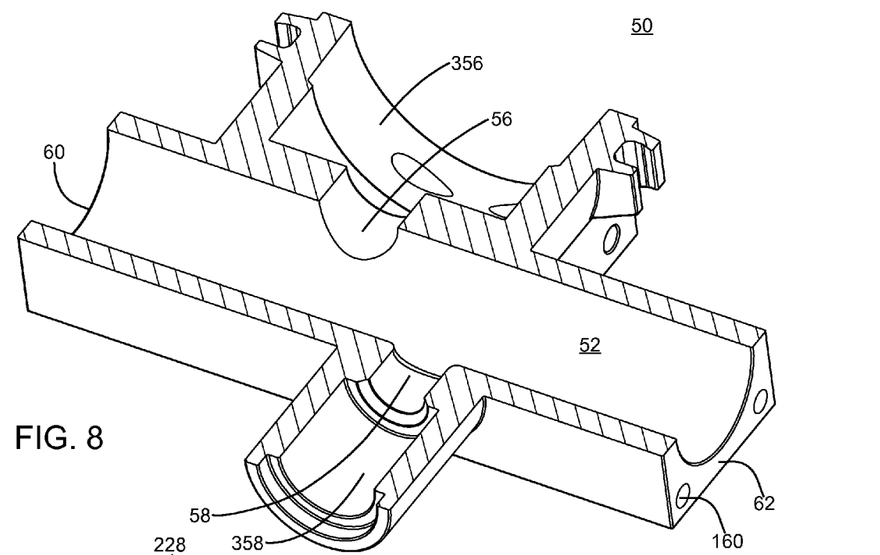
FIG. 8 is an enlarged cross-sectional perspective view of the valve body of FIG. 6.

An example embodiment of the valve body 50 is depicted at FIG. 8. The valve body 50 may comprise a bore 52 that defines an axis 54 (see FIG. 7). The bore 52 may comprise a cylindrical bore, as depicted at the figures, and/or may comprise other shapes. The valve body 50 may extend from a first end 60 of the valve body 50 to a second end 62 of the valve body 50. The axis 54 and/or the bore 52 may extend from the first end 60 to the second end 62 of the valve body 50.

The valve body 50 may comprise a passage 56 open to the bore 52 and a passage 58 open to the bore 52. The passage 56 may be included in a port 356 of the valve 20, and the passage 58 may be included in a port 358 of the valve 20. The passage 56 may comprise an inlet passage, and the passage 58 may comprise an outlet passage. The port 356 may comprise an inlet port, and the port 358 may comprise an outlet port. The ports 356, 358 may be individually and/or jointly configured with a variety of connections (e.g., a threaded connection, a hose barb connection, a quick releasing connection, etc.) suited for a variety of applications (e.g., attachment to a hose, a tank, a pipe, etc.). The port 358, if configured as the outlet port, may be integrated with and/or connected directly to a nozzle (e.g., a spray nozzle). Features on the ports 356, 358 illustrated at the figures are example features. The features on the ports 356, 358 may be rearranged, removed, and/or swapped with other features known in the art of connections. In certain embodiments, the port 356 may comprise the outlet port, and the port 358 may comprise the inlet port. When the valve 20 is set to the open configuration (see FIG. 3), the passages 56, 58 may be open to each other and allow the fluid 22 to pass between the passages 56, 58. When the valve 20 is set to the closed configuration (see FIG. 4), the passages 56, 58 may be blocked-off from each other and not allow and/or substantially not allow the fluid 22 to pass between the passages 56, 58.

The valve spool 80 may comprise a first end 82 and a second end 84 (see FIG. 10) and may be axisymmetric, as depicted at the figures. In other embodiments, the valve spool 80 may not be axisymmetric and/or may include portions that are non-axisymmetric. The valve spool 80 may be at least partially positioned within the bore 52 of the valve body 50 and be slidable along the axis 54 of the bore 52. The valve spool 80 may comprise a sealing member 86, a sealing member 88, and a sealing member 90 (see FIG. 7). The sealing members 86, 88, 90 may each be in sealing contact with the bore 52. As depicted at the figures, the sealing members 86, 88, 90 are O-rings, arranged in pairs. In other embodiments, the sealing members 86, 88, 90 may be single O-rings. In other embodiments, the sealing members 86, 88, 90 may comprise other shapes and/or components (e.g. a lip seal). In certain embodiments, the sealing members 86, 88, 90 may be unitary with and/or integrated with the valve spool 80. In certain embodiments, the sealing members 86, 88, 90 may be absent. In certain embodiments, the sealing members 86, 88, 90 may only partially seal with the bore 52 and/or may allow significant leakage.

Figures 9, 10:
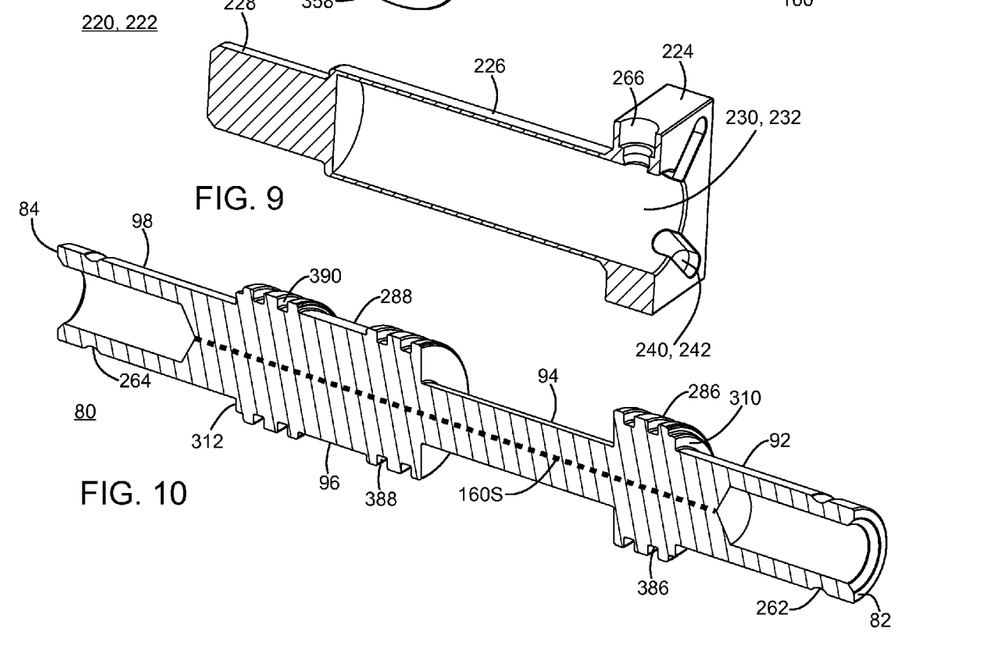
FIG. 9 is an enlarged cross-sectional perspective view of an end piece of the valve of FIG. 1.
FIG. 10 is an enlarged cross-sectional perspective view of the valve spool of the valve of FIG. 1.

As depicted at FIG. 10, the valve spool 80 may comprise a reduced-section region 92 positioned between the end 82 of the valve spool 80 and the sealing member 86 (see FIG. 7), a reduced-section region 94 positioned between the sealing member 86 and the sealing member 88, and a reduced-section region 98 positioned between the sealing member 90 and the end 84 of the valve spool 80. The valve spool 80 may comprise a reduced-section region 96 positioned between the sealing member 88 and the sealing member 90. When the valve 20 is set to the open configuration (see FIG. 3), the reduced-section region 94 may be positioned between the passages 56, 58 in the bore 52 thereby opening the passages 56, 58 to each other and thereby allowing the fluid 22 to pass between the passages 56, 58. When the valve 20 is set to the closed configuration (see FIG. 4), the sealing member 88 (see FIG. 7) may be positioned between the passages 56, 58 in the bore 52 thereby blocking-off the passages 56, 58 from each other and thereby not allowing and/or substantially not allowing the fluid 22 to pass between the passages 56, 58.

When the sealing member 88 (see FIG. 7) of the valve spool 80 blocks-off the passages 56, 58 from each other (see FIG. 4), the sealing member 88 may thereby form a barrier between the passage 56 and the passage 58. To accommodate positioning the sealing member 88 between the passages 56, 58, the passages 56, 58 may be offset from each other along the axis 54. As depicted, the passage 56 may be positioned nearer to the first end 60 of the valve body 50 than the passage 58, and the passage 58 may be positioned nearer to the second end 62 of the valve body 50 than the passage 56.

The valve spool 80 may comprise a sealing region 286 and a sealing region 288 (see FIG. 10). The sealing regions 286, 288 may each be in sealing contact with the bore 52. The sealing regions 286, 288 may directly seal against the bore 52 and/or the sealing members 86, 88, 90 may seal against the bore 52. The sealing member(s) 86 may be seated in groove(s) 386 of the sealing region 286, and the sealing member(s) 88, 90 may be seated in groove(s) 388, 390 of the sealing region 288. The reduced-section region 94 may be positioned between the sealing region 286 and the sealing region 288.

Figure 1:
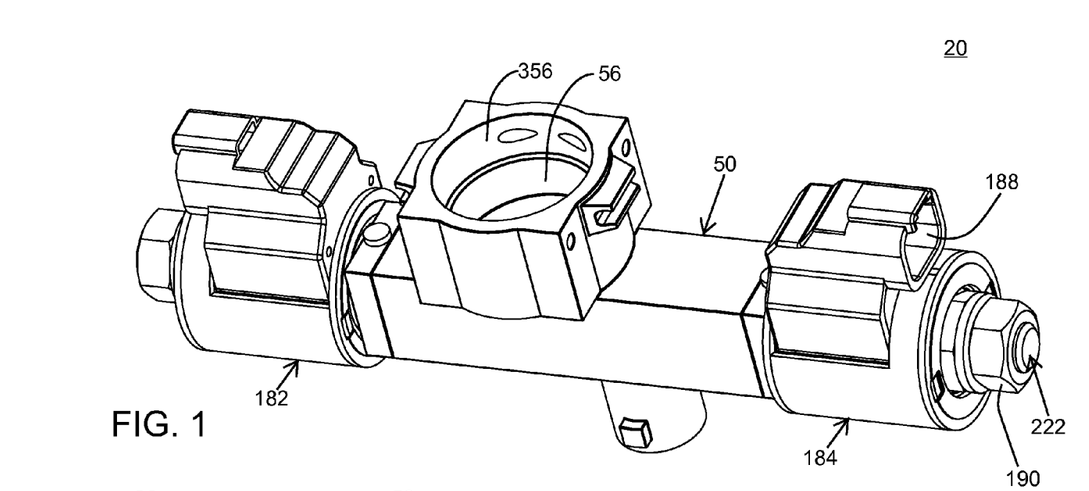
FIG. 1 is a perspective view of a valve with a portion of an interior of a first port of the valve visible.
Figure 2:
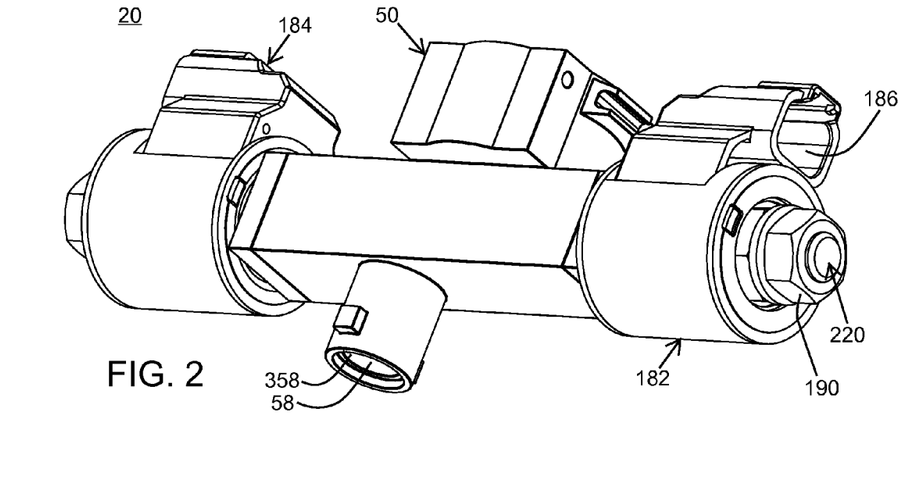
FIG. 2 is a perspective view of the valve of FIG. 1 with a portion of an interior of a second port of the valve visible.
Figure 3:
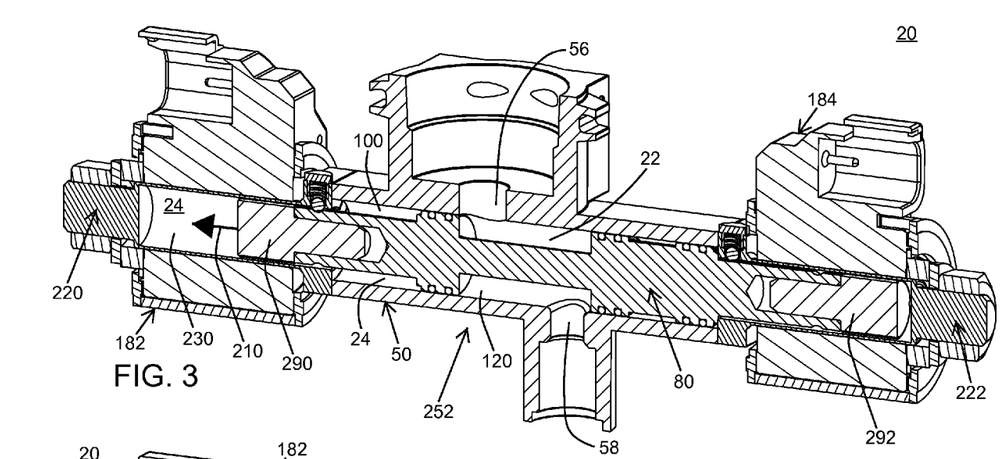
FIG. 3 is a cross-sectional perspective view of the valve of FIG. 1 with a valve spool of the valve at an open position.
Figure 4:
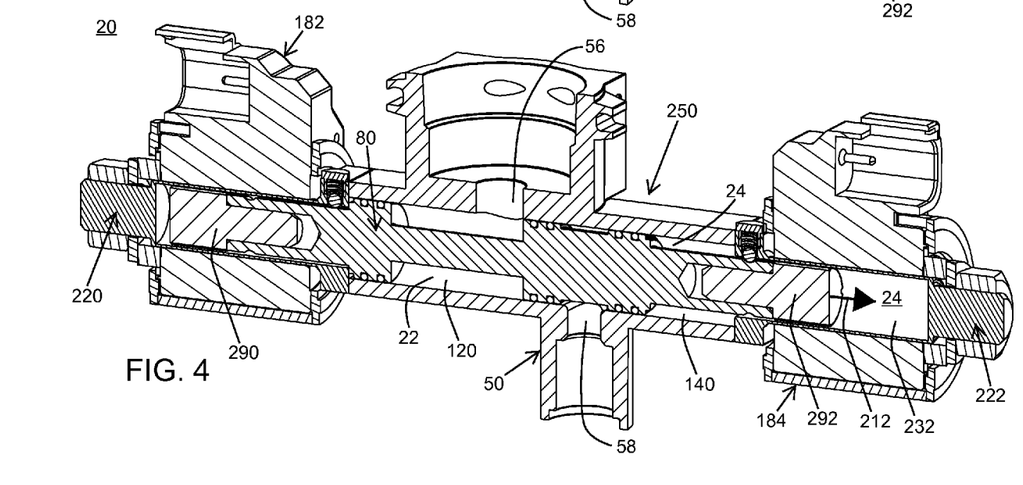
FIG. 4 is the cross-sectional perspective view of FIG. 3 but with the valve spool of the valve of FIG. 1 at a closed position.

As depicted at FIG. 4, when the valve 20 is set to the closed configuration, the sealing region 288 may plug and/or block the passage 58 in the bore 52 thereby blocking-off the passage 58 and thereby not allowing and/or substantially not allowing the fluid 22 to pass to and/or from the passage 58. The passage 56 may similarly be blocked/plugged. When the valve 20 is set to the open configuration (see FIG. 3), the sealing region 288 may unplug and/or unblock the passage 58 in the bore 52 thereby opening the passage 58 and thereby allowing the fluid 22 to pass to and/or from the passage 58.

As depicted at FIG. 10, the valve spool 80 may comprise an end area 310 adjacent the end 82 of the valve spool 80 and an end area 312 adjacent the end 84 of the valve spool 80. By being adjacent to the ends 82, 84, the end areas 310, 312 may be either at and/or near the ends 82, 84 of the valve spool 80. The end area 310 may include a projected area facing in a direction that the end 82 faces. The projected area of the end area 310 may include the end 82. The end area 312 may include a projected area facing in a direction that the end 84 faces. The projected area of the end area 312 may include the end 84. The end areas 310, 312 may individually and/or each be a single area with the respective projected area, and/or the end areas 310, 312 may individually and/or each include multiple areas with the respective projected areas. The projected areas may be generally perpendicular to the axis 54 of the bore 52 (see FIG. 7).

The valve actuator arrangement 180 (see FIG. 7) may be adapted to apply a momentary load 210 (see FIG. 3) on the valve spool 80 to move the valve spool 80 to the closed position 250 (see FIG. 4) and/or may be adapted to apply a momentary load 212 (see FIG. 4) on the valve spool 80 to move the valve spool 80 to the open position 252 (see FIG. 3). The valve actuator arrangement 180 may comprise a solenoid 182 adjacent the end 60 of the valve body 50 and/or a solenoid 184 adjacent the end 62 of the valve body 50. By being adjacent to the ends 60, 62, the solenoids 182, 184 may be either at and/or near the ends 60, 62, respectively, of the valve body 50. The solenoids 182, 184 may individually and/or each be a single-acting solenoid and/or a double-acting solenoid. The solenoid 182 may be adapted, when energized, to apply the momentary load 210 on the valve spool 80 to move the valve spool 80 to the closed position 250. The solenoid 184 may be adapted, when energized, to apply the momentary load 212 on the valve spool 80 to move the valve spool 80 to the open position 252.

The valve 20 may include a magnetic element 290 and/or a magnetic element 292 (see FIG. 7). The magnetic elements 290, 292 may be considered part of the solenoids 182, 184, respectively, as they may interact with coils 300, 302 (see FIG. 5) of the solenoids 182, 184, respectively. The magnetic elements 290, 292 may also be considered part of the valve spool 80 as they may be attached to and/or integrated with the valve spool 80. As depicted at FIGS. 3-6, the magnetic element 290 may be attached/mounted to the end 82 of the valve spool 80, and/or the magnetic element 292 may be attached/mounted to the end 84 of the valve spool 80. The attachments may include threaded connections. The magnetic element 290 may be attached/mounted adjacent the end 82 of the valve spool 80, and/or the magnetic element 292 may be attached/mounted adjacent the end 84 of the valve spool 80. By being adjacent to the ends 82, 84, the magnetic elements 290, 292 may be at and/or near the ends 82, 84, respectively. The end area 310 of the valve spool 80 may comprise a projected area of the magnetic element 290 facing in the direction that the end 82 faces, and the end area 312 of the valve spool 80 may comprise a projected area of the magnetic element 292 facing in the direction that the end 84 faces.

When the coil 300 (see FIG. 5) of the solenoid 182 is energized by supplying electrical power to an electrical connector 186 (see FIG. 2), the solenoid 182 may apply the momentary load 210 on the magnetic element 290 of the valve spool 80 to move the valve spool 80 to the closed position 250 (see FIG. 4). When the coil 302 of the solenoid 184 is energized by supplying electrical power to an electrical connector 188 (see FIG. 1), the solenoid 184 may apply the momentary load 212 on the magnetic element 292 of the valve spool 80 to move the valve spool 80 to the open position 252 (see FIG. 3). The magnetic element 290 may be magnetically attracted by the coil 300 of the solenoid 182 when the solenoid 182 is energized, and the magnetic element 292 may be magnetically attracted by the coil 302 of the solenoid 184 when the solenoid 184 is energized. As depicted at FIGS. 3 and 4, the momentary load 210 and the momentary load 212 may be applied as tensile loads to the valve spool 80. By applying the momentary loads 210, 212 to the valve spool 80 as the tensile loads, the valve spool 80 may not be subjected to buckling loads (e.g., compressive loads). By avoiding the application of buckling loads on the valve spool 80, the valve spool 80 and/or portions of the valve spool 80 may be made lighter and/or more slender. In particular, the reduced-section regions 92, 94, 96, and/or 98 of the valve spool 80 may be made more slender and/or lighter. By the reduced section regions 92, 94, and/or 98 being lighter, the mass of the valve spool 80 may be reduced thereby enabling faster actuation times for the valve 20 and/or reducing inertial loads of the valve spool 80 as it starts and stops movement. By the reduced section region 94 being more slender, flow of the fluid 22 between the passage 56 and the passage 58 may be less restricted by the valve spool 80. By applying the momentary loads 210, 212 to the valve spool 80 as the tensile loads, the valve spool 80 may avoid binding in the bore 52.

The solenoids 182, 184 may comprise, for example, solenoids sold by HydraForce Inc. of Lincolnshire, Ill. In particular, the solenoids 182, 184 may comprise an SV08-20 solenoid sold by HydraForce Inc. The solenoids 182, 184 may comprise other solenoids. In certain embodiments, the solenoids 182, 184 may each draw one ampere of electrical current when energized. In other embodiments, the solenoids 182, 184 may each draw four amperes of electrical current when energized. In still other embodiments, the solenoids 182, 184 may each draw other amounts of electrical current when energized.

In certain applications, it may be desired to use many of the valves 20. In certain agricultural spraying applications, it may be desired to use one hundred-forty of the valves 20. As described above, the valves 20 may be adapted to function with the momentary loads 210, 212 from the solenoids 182, 184 controlling them. In certain embodiments, the solenoids 182, 184 may be energized only when the momentary loads 210, 212 from the solenoids 182, 184 are desired. The solenoids 182, 184 may be unpowered when the momentary loads 210, 212 are not desired. In many applications, the valve 20 may spend a substantial majority of its service time with the valve spool 80 in either the closed position 250 and/or the open position 252. Thus, in many applications, the valve 20 may spend a substantial majority of its service time unpowered. By spending a substantial majority of its service time unpowered, the valve 20 may save substantial energy when compared to valves that remain energized when open, valves that remain energized when closed, and/or valves that remain energized when open and closed. This energy savings may be multiplied by the number of the valves 20 in a given application. This energy savings may allow an electrical system and/or certain components of an electrical system to have a lower capacity than would otherwise be required. For example, an alternator, a battery, wire cross-sections, etc. may be lower in capacity if the valve 20 is used instead of a continuously energized valve.

In certain embodiments, the solenoids 182, 184 may remain energized after the valve spool 80 has shifted. By remaining energized, the solenoids 182 and 184 keep the valve spool 80 in the closed position 250 and the open position 252, respectively.

The solenoids 182, 184 may actuate the valve 20 quickly. In certain embodiments, the solenoids 182, 184 may move the valve spool 80 from the closed position 250 to the open position 252 and/or from the open position 252 to the closed position 250 in about 0.5 seconds. In other embodiments, the solenoids 182, 184 may move the valve spool 80 from the closed position 250 to the open position 252 and/or from the open position 252 to the closed position 250 in about 0.2 seconds. In still other embodiments, the solenoids 182, 184 may move the valve spool 80 from the closed position 250 to the open position 252 and/or from the open position 252 to the closed position 250 in other amounts of time. As depicted at the figures, the valve 20 may not necessarily have a return spring in certain embodiments. The lack of a return spring resisting the solenoids 182, 184 may reduce the actuation time of the valve 20 compared with valves that include a return spring.

The quick actuation of the valve 20 may allow other benefits. For example, in applications having many of the valves 20, the solenoids 182, 184 of the individual valves 20 may be energized sequentially and/or may be energized sequentially in groups of the valves 20. By energizing the valves 20 sequentially instead of simultaneously, a peak power required of the electrical system can be reduced. By reducing the peak power required, the electrical system may have a lower capacity than would otherwise be required. Without the quick actuation of the valve 20, sequential actuation in applications having many of the valves 20 may not be practical.

As depicted at FIGS. 3-7, the valve 20 may comprise an end piece 220 mounted on the end 60 (see FIG. 8) of the valve body 50, and an end piece 222 mounted on the end 62 of the valve body 50. The end piece 220 may define a cavity 230, and the end piece 222 may define a cavity 232. The end pieces 220, 222 may be substantially identical to each other (see FIG. 9). The end pieces 220, 222 may each define a flanged portion 224, a cylindrical portion 226, and a threaded portion 228. The flanged portion 224 may be attached to either of the ends 60, 62 of the valve body 50. The solenoids 182, 184 may each separately be positioned over the cylindrical portion 226. The solenoids 182, 184 may be mounted at least partially over the end pieces 220, 222, respectively. The solenoids 182, 184 may be secured to the end pieces 220, 222, respectively, by threading a nut 190 (see FIGS. 1,2, and 7) over the threaded portion 228 of the respective end piece 220, 222, and thereby capturing the respective solenoid 182, 184 between the nut 190 and the flanged portion 224.

Figures 5, 6:
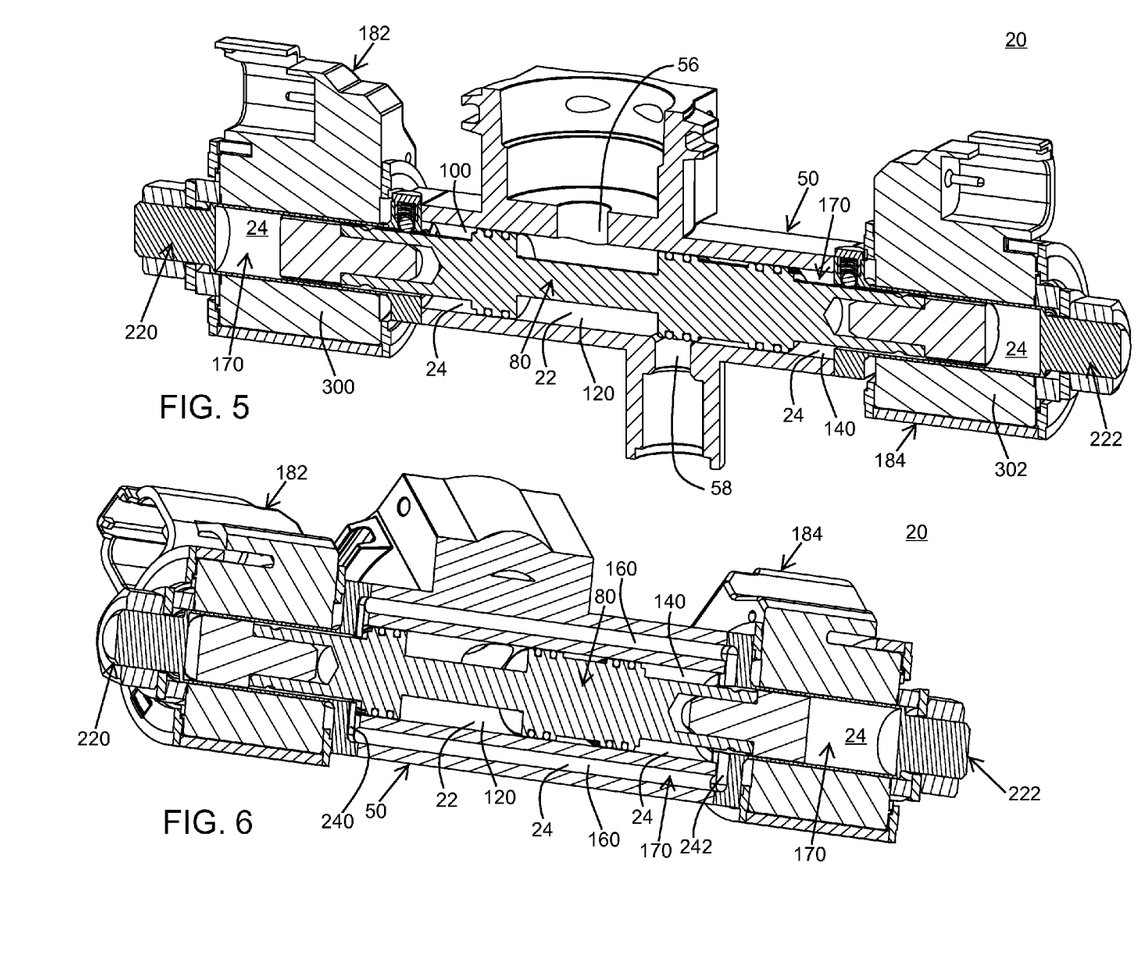
FIG. 5 is the cross-sectional perspective view of FIG. 3 but with the valve spool of the valve of FIG. 1 at a transitional position.
FIG. 6 is a cross-sectional perspective view of the valve of FIG. 1 with the valve spool of the valve at the closed position of FIG. 4 and with a passage through a valve body of the valve visible.

As depicted at FIGS. 5, 7, and 10, a chamber 100 may be comprised, at least in part, between the bore 52 of the valve body 50 and the reduced-section region 92 of the valve spool 80. In embodiments where the reduced-section region 92 is absent, the chamber 100 may be at the end 82 of the valve spool 80. The chamber 100 may be further comprised by the cavity 230 within the end piece 220 (see FIG. 3). A chamber 120 may be comprised, at least in part, between the bore 52 of the valve body 50 and the reduced-section region 94 of the valve spool 80. A chamber 140 may be comprised, at least in part, between the bore 52 of the valve body 50 and the reduced-section region 98 of the valve spool 80. In embodiments where the reduced-section region 98 is absent, the chamber 140 may be at the end 84 of the valve spool 80. The chamber 140 may be further comprised by the cavity 232 within the end piece 222 (see FIG. 4).

As depicted at FIGS. 5 and 6, a passage 160 may be open to the chamber 100 and the chamber 140. The passage 160 may comprise multiple passages. In particular, the chamber 100 may be connected to the passage 160 by a passage 240. As depicted, the passage 240 may be comprised by the end piece 220 (see FIG. 9). The passage 240 may comprise multiple passages. The chamber 140 may be connected to the passage 160 by a passage 242. As depicted, the passage 242 may be comprised by the end piece 222 (see FIG. 9). The passage 242 may comprise multiple passages. As depicted, the passage 160 may comprise four passages arranged to pass through the valve body 50. In particular, the four passages are arranged in four corners of a square cross-sectional shape of the valve body 50 with the four passages surrounding the bore 52. The passage 160 may include other arrangements. For example, the passage 160 may comprise a passage 160S (see FIG. 10) that extends through the valve spool 80 between the chamber 100 and the chamber 140. As depicted, the passages 240, 242 may comprise four passages arranged to extend radially about the axis 54 of the bore 52. Other means, such as an external hose, tube, pipe, housing, etc. may be used to provide the passage 160 (i.e., a fluid connection) between the chamber 100 and the chamber 140.

A fluid 24 may occupy the chamber 100, the chamber 140, the passage 160, the passage 240, and the passage 242. The fluid 24 may be any fluid including liquids, gasses, and/or other various fluids as described above with respect to the fluid 22. A volume 170 (see FIGS. 5 and 6) may be defined by and/or substantially defined by the chamber 100, the chamber 140, the passage 160, the passage 240, and the passage 242. The fluid 24 may thus occupy the volume 170. The volume 170 may be a constant volume that remains fixed in displacement when the valve 20 is at the open configuration (see FIG. 3), the closed configuration (see FIG. 4), and transitional configurations (see FIG. 5) between the open configuration and the closed configuration. The volume 170 may be a sealed volume that remains sealed and/or substantially sealed from the environment and/or the fluid 22. The fluid 24 may be transferred between the chamber 100 and the chamber 140 via the passage 160 when the valve spool 80 is moved between the open position 252 and the closed position 250. The fluid 24 may be transferred between the chamber 140 and the chamber 100 via the passage 160 when the valve spool 80 is moved between the closed position 250 and the open position 252.

The volume 170 may be vented (e.g., vented to the atmosphere) at one or more locations. By venting the volume 170, the passage 160 may not be required and/or the environment and the vents may serve as the passage 160. When venting the volume 170 to the environment, the fluid 24 may be the fluid of the environment (e.g., air if the environment of the valve includes air). A detent member holder 266, further described below, may serve as the vent(s) (see FIG. 9). By venting the volume 170, the valve 20 may be vulnerable to debris entering the volume 170 via the vents. Filters may be added to reduce and/or eliminate this vulnerability. By venting the volume 170 to the environment, a leak of the fluid 22 at the sealing members 86, 88, 90 may result in the fluid 22 leaking into the environment. An advantage of sealing the volume 170 may be that any leaks of the fluid 22 at the sealing members 86, 88, 90 are contained within the valve 20 and/or the plumbing to which the valve 20 is connected.

The magnetic elements 290, 292 may comprise one and/or more passages 294 (e.g., grooves) to allow the fluid 24 to pass across the magnetic elements 290, 292 (see FIG. 7). In embodiments where the passage 160 comprises the passage 160S (see FIG. 10) that extends through the valve spool 80, the one and/or more passages 294 may align with the passage 160S. As illustrated, the magnetic elements 290, 292 may be contained within the volume 170 and thereby be contained in the sealed volume. The magnetic elements 290, 292 may thus be sealed from the environment, the coils 300, 302, and/or the fluid 22.

As the fluid 24 is transferred within the volume 170 (e.g., between the chamber 100 and the chamber 140), the fluid 24 may pass through/across the passage 160, the passage 160S, the passage 240, the passage 242, the passage 294, and other passages. By configuring one and/or more of the passages 160, 160S, 240, 242, 294, and selecting the fluid 24 in view of the passage configuration, dynamic behavior of the valve 20 may be tailored to requirements of specific applications. The selected fluid 24 may be air, oil, and/or other fluid. As the fluid 24 passes through the volume 170, including the passages 160, 160S, 240, 242, 294, dynamic pressure, pressure gradients, viscous friction, and/or other load developing effects may develop. The load developing effects may be used and/or tailored to control time response and/or other dynamic behavior (e.g., to provide cushioning) of the valve 20. Check valves, orifices, and/or other fluid controlling components may be included within one and/or more of the passages 160, 160S, 240, 242, 294, to control/modify the passage of the fluid 24.

As depicted at FIGS. 3, 4, and 10, the end area 310 of the valve spool 80 may face into the chamber 100, and the end area 312 of the valve spool 80 may face into the chamber 140. As depicted at FIGS. 3, 4, and 7, the end area 310 of the valve spool 80 may also face into the cavity 230, and the end area 312 of the valve spool 80 may also face into the cavity 232. As mentioned above, the cavity 230 may be part of the chamber 100, and the cavity 232 may be part of the chamber 140.

When the valve spool 80 is at the open position 252, the passage 56 and the passage 58 may be both open to the chamber 120 thereby allowing the fluid 22 to pass between the passage 56 and the passage 58. When the valve spool 80 is at the closed position 250, the passage 56 and the passage 58 may not be both open to the chamber 120 thereby preventing the fluid 22 from passing between the passage 56 and the passage 58. To effect opening the passage 56 to the passage 58, the valve actuator arrangement 180 may be momentarily energized thereby moving the valve spool 80 to the open position 252. To effect closing the passage 56 from the passage 58, the valve actuator arrangement 180 may be momentarily energized thereby moving the valve spool 80 to the closed position 250.

When effecting the opening and the closing of the passage 56 to/from the passage 58, a portion of the internal fluid 24 may be transferred between the cavity 230/the chamber 100 and the cavity 232/the chamber 140. The transferred portion of the internal fluid 24 may equalize pressure applied on the end area 310 and the end area 312 of the valve spool 80 by the internal fluid 24. As depicted at the figures, the end area 310 and the end area 312 may be equal and/or substantially equal. The equalized pressure applied on the equal end areas 310, 312 of the valve spool 80 may result in no net force being applied on the valve spool 80 when at the open position 252 and/or the closed position 250. Thus the valve spool 80 will tend to stay at the open position 252 when at the open position 252 and also tend to stay at the closed position 250 when at the closed position 250.

In anticipation of events that may apply a net force on the valve spool 80 when at the open position 252 and/or the closed position 250 (other than the forces 210, 212 applied by the solenoids 182, 184), a holding means for the valve spool 80 may be provided. The holding means may retain the valve spool 80 at the closed position 250 after the momentary load 210 on the valve spool 80 has been released and/or may retain the valve spool 80 at the open position 252 after the momentary load 212 on the valve spool 80 has been released. Load events that may apply the net force on the valve spool 80 include vibrational loads, dynamic fluid loads, fluid momentum loads, gravity, and other loads. The load events may be caused by and/or otherwise involve the fluid 22. The holding means may comprise friction between the valve spool 80 and the bore 52 of the valve body 50. The holding means may comprise at least one detent member 260 between the valve spool 80 and the valve body 50. The friction between the valve spool 80 and the bore 52 may comprise friction between at least one of the sealing members 86, 88, 90 of the valve spool 80 and the bore 52. The detent member 260 and the friction may be used together.

As illustrated at FIGS. 5, 7, 9, and 10, the detent member 260 may comprise one and/or more balls that engage one and/or more detent grooves 262, 264 of the valve spool 80. The detent member holder 266 may be included in each of the end pieces 220, 222. In particular, the detent member holder 266 may be included in the flanged portion 224. The end pieces 220, 222 may each thereby mount at least one of the detent members 260, and the detent members 260 may thereby retain the valve spool 80 at the closed position 250 and the open position 252 after at least one of the solenoids 182, 184 has been de-energized. A spring 270 and/or other elastic member may be provided to urge the detent member 260 to engage the detent grooves 262, 264 of the valve spool 80 (see FIG. 7). The spring 270 may be housed, along with the detent member 260, in the detent member holder 266. A cap 268 may cover and/or seal the detent member holder 266 and may also retain the detent member 260 and the spring 270 within the detent member holder 266. As depicted, the detent member holder 266 may be used as a port and/or vent to fill/drain the volume 170 with the fluid 24. The cap 268 may be used to cover/seal the port and/or the vent (i.e., the detent member holder 266). The port and/or the vent may be provided separately from the detent member holder 266.

The present disclosure also provides a method for controlling flow of the fluid 22. The method may comprise receiving the fluid 22 input at the input port 356, that is open to the passage 56, into the valve body 50; directing the fluid 22 input from the input port 356 through the passage 56 into the bore 52; blocking a flow of the fluid 22 input to the passage 58, that is coupled to the output port 358, when the valve spool 80 is at the closed position 250; applying the momentary load 212 from the valve actuator arrangement 180 to the valve spool 80 to slide the valve spool 80 to the open position 252; transferring a portion of the internal fluid 24 between the cavity 230 and the cavity 232 via the connecting passage 160 when sliding the valve spool 80 from the closed position 250 to the open position 252; and directing the fluid 22 input from the bore 52 through the passage 58 and into the output port 358.

Various sensors may be provided on the valve 20. The sensors may be used to detect the position of the valve spool 80. In particular, the sensors may be used to detect if the valve spool 80 is at the closed position 250 and/or at the open position 252. A control system may be used in conjunction with the sensors and the solenoids 182, 184. In particular, the control system may continuously and/or periodically test, via the sensors, if the valve spool 80 is at a desired position (e.g., the closed position 250 or the open position 252). If the valve spool 80 is not at the desired position, and/or if the valve spool 80 is drifting from the desired position, the control system may energize the appropriate solenoid 182, 184 to bring the valve spool 80 back to the desired position. The control system may periodically and/or continuously energize the appropriate solenoid 182, 184 to keep the valve spool 80 at the desired position. The control system may periodically send restoring pulses to the appropriate solenoid 182, 184 to keep the valve spool 80 at the desired position. The control system may vary the current and/or the voltage applied to the solenoids 182, 184.

The valve 20 and/or components of the valve 20 may be scaled to suit various flow rates and/or pressure drops of the fluid 22 across the valve 20.

While certain embodiments of the invention have been described, other embodiments may exist. While the specification may comprise examples, the invention's scope is indicated by the following claims. Furthermore, while the specification has been described in language specific to structural features and/or methodological acts, the claims are not limited to the features and/or acts described above. Rather, the specific features and acts described above are disclosed as example for embodiments of the invention.

What is claimed is:

1. A valve comprising:
   a valve body comprising a bore comprising an axis, a first passage open to the bore, and a second passage open to the bore;
   a valve spool comprising a first end and a second end, the valve spool at least partially positioned within the bore of the valve body and slidable along the axis of the bore, the valve spool comprising a first sealing member, a second sealing member, and a third sealing member, the sealing members each being in sealing contact with the bore, the valve spool comprising a first reduced-section region positioned between the first end of the valve spool and the first sealing member, a second reduced-section region positioned between the first sealing member and the second sealing member, and a third reduced-section region positioned between the third sealing member and the second end of the valve spool, wherein the valve spool comprises a first detent groove located at the first end and a second detent groove located at the second end, wherein the valve body comprises a first detent member holder located at a first end thereof and a second detent member holder located at a second end thereof, wherein a first detent member and a second detent member are located in the first and second detent member holders respectively, wherein the first detent member is configured to engage the first detent groove when the valve spool is in an open position, wherein the second detent member is configured to engage the second detent groove when the valve spool is in closed position, wherein each of the first detent member and the second detent member comprises at least one ball that engages the first detent groove and the second detent groove respectively, wherein at least one of the first detent member holder and the second detent member holder comprises a sealable opening, and wherein the sealable opening is configured to change a volume of a second fluid in a first chamber and a third chamber;
   the first chamber comprised at least in part between the bore of the valve body and the first reduced-section region of the valve spool;
   a second chamber comprised at least in part between the bore of the valve body and the second reduced-section region of the valve spool;

the third chamber comprised at least in part between the bore of the valve body and the third reduced-section region of the valve spool;

a third passage open to the first chamber and the third chamber;

a valve actuator arrangement adapted to apply a first momentary load on the valve spool to move the valve spool to a closed position and adapted to apply a second momentary load on the valve spool to move the valve spool to an open position; and a first magnetic element and a second magnetic element, wherein the first magnetic element is mounted adjacent the first end of the valve spool and the second magnetic element is mounted adjacent the second end of the valve spool, wherein the magnetic elements comprise grooves to allow the second fluid to pass across the magnetic elements, the grooves being sized for the fluid and configured to customize a control time in response to a dynamic behavior property;

wherein when the valve spool is at the open position the first passage and the second passage are both open to the second chamber thereby allowing a first fluid to pass between the first passage and the second passage;

wherein when the valve spool is at the closed position the valve spool forms a barrier between the first passage and the second passage and thereby substantially prevents the first fluid from passing between the first passage and the second passage; and wherein the second fluid is transferred between the first chamber and the third chamber via the third passage when the valve spool is moved between the open position and the closed position.

2. The valve of claim 1, wherein the first passage comprises an inlet passage and the second passage comprises an outlet passage.

3. The valve of claim 1, wherein the valve spool comprises a fourth reduced-section region positioned between the second sealing member and the third sealing member.

4. The valve of claim 1, wherein the third passage is at least partly comprised by the valve spool.

5. The valve of claim 1, wherein the third passage is at least partly comprised by the valve body.

6. The valve of claim 1, wherein the valve actuator arrangement comprises a double acting solenoid.

7. The valve of claim 1, wherein the valve actuator arrangement comprises a first solenoid adjacent a first end of the valve body and a second solenoid adjacent a second end of the valve body.

8. The valve of claim 7, wherein when the first solenoid is energized the first solenoid applies the first momentary load on the valve spool to move the valve spool to the closed position, wherein when the second solenoid is energized the second solenoid applies the second momentary load on the valve spool to move the valve spool to the open position, and wherein both the first momentary load and the second momentary load are applied as tensile loads to the valve spool.

9. The valve of claim 8, further comprising a holding means to retain the valve spool at the closed position after the first momentary load on the valve spool has been released and to retain the valve spool at the open position after the second momentary load on the valve spool has been released.

10. The valve of claim 9, wherein the holding means comprises friction between at least one of the sealing members of the valve spool and the bore of the valve body.

11. The valve of claim 9, wherein the holding means comprises at least one detent between the valve spool and the valve body.

12. The valve of claim 1, wherein the first passage and the second passage of the valve body are offset from each other along the axis of the bore with the first passage positioned nearer to a first end of the valve body than the second passage and with the second passage positioned nearer to a second end of the valve body than the first passage.

13. The valve of claim 1, further comprising a first end piece mounted on a first end of the valve body and a second end piece mounted on a second end of the valve body, wherein the first chamber is further comprised by a first cavity within the first end piece and the third chamber is further comprised by a second cavity within the second end piece.

14. The valve of claim 13, wherein the valve actuator arrangement comprises a first solenoid mounted at least partially over the first end piece and a second solenoid mounted at least partially over the second end piece, wherein the third passage is at least partly comprised by the valve body, wherein the first chamber is connected to the third passage by a fourth passage comprised by the first end piece and the third chamber is connected to the third passage by a fifth passage comprised by the second end piece, and wherein at least one of the first end piece and the second end piece mounts at least one detent member to retain the valve spool after at least one of the solenoids has been de-energized.

15. A valve comprising:
a valve body comprising a bore comprising an axis, a first passage open to the bore, and a second passage open to the bore;

a valve spool comprising a first end and a second end, the valve spool at least partially positioned within the bore of the valve body and slidable along the axis of the bore, the valve spool comprising a first sealing region and a second sealing region, the sealing regions each being in sealing contact with the bore, the valve spool comprising a reduced-section region positioned between the first sealing region and the second sealing region;

a first chamber comprised at least in part between the bore of the valve body and the valve spool adjacent the first end of the valve spool;

a second chamber comprised at least in part between the bore of the valve body and the reduced-section region of the valve spool;

a third chamber comprised at least in part between the bore of the valve body and the valve spool adjacent the second end of the valve spool;

a third passage open to the first chamber and the third chamber;

a first solenoid adjacent a first end of the valve body adapted to apply a first momentary load on the valve spool to move the valve spool to a closed position;

a second solenoid adjacent a second end of the valve body adapted to apply a second momentary load on the valve spool to move the valve spool to an open position; and a first magnetic element and a second magnetic element, wherein the first magnetic element is mounted adjacent the first end of the valve spool and the second magnetic element is mounted adjacent the second end of the valve spool, wherein the first magnetic element is magnetically attracted by a first coil of the first solenoid when the first solenoid is energized and the second magnetic element is magnetically attracted by a second coil of the second solenoid when the second solenoid is energized, and wherein the magnetic elements comprise grooves to allow a second fluid to pass across the magnetic elements, the grooves being sized for the fluid and configured to customize a control time in response to a dynamic behavior property;

wherein when the valve spool is at the open position the first passage and the second passage are both open to the second chamber thereby allowing a first fluid to pass between the first passage and the second passage;

wherein when the valve spool is at the closed position the valve spool forms a barrier between the first passage and the second passage and thereby substantially prevents the first fluid from passing between the first passage and the second passage;

wherein the valve spool comprises a first detent groove located at the first end and a second detent groove located at the second end, wherein the valve body comprises a first detent member holder located at a first end thereof and a second detent member holder located at a second end thereof, wherein a first detent member and a second detent member are located in the first and the second detent member holders respectively, wherein the first detent member is configured to engage the first detent groove when the valve spool is in an open position, wherein the second detent member is configured to engage the second detent groove when the valve spool is in closed position, wherein each of the first detent member and the second detent member comprises at least one ball that engages the first detent groove and the second detent groove respectively, wherein at least one of the first detent member holder and the second detent member holder comprises a sealable opening, and wherein the sealable opening is configured to change a volume of the second fluid in the first and the third chambers; and wherein the second fluid is transferred between the first chamber and the third chamber via the third passage when the valve spool is moved between the open position and the closed position.

16. The valve of claim 15, further comprising a first end piece mounted on a first end of the valve body and a second end piece mounted on a second end of the valve body, wherein the first chamber is further comprised by a first cavity within the first end piece and the third chamber is further comprised by a second cavity within the second end piece.

17. The valve of claim 16, wherein the first solenoid is mounted at least partially over the first end piece and the second solenoid is mounted at least partially over the second end piece, wherein the third passage is at least partly comprised by the valve body, and wherein the first chamber is connected to the third passage by a fourth passage comprised by the first end piece and the third chamber is connected to the third passage by a fifth passage comprised by the second end piece.

18. The valve of claim 17, wherein at least one of the first end piece and the second end piece mounts at least one detent member adapted to retain the valve spool at a position after at least one of the solenoids has been de-energized.

19. A method for controlling a flow of a fluid, the method comprising:

customizing a control time to a dynamic property by providing a first magnetic element and a second magnetic element, the first magnetic element is mounted adjacent a first end of a valve spool and the second magnetic element is mounted adjacent a second end of the valve spool, the magnetic elements comprising grooves to allow an internal fluid to pass across the first magnetic element and the second magnetic element;

receiving a fluid input at an input port open to a first passage into the valve body, the valve body comprising a bore and the valve spool at least partially positioned within the bore, and wherein the valve spool is slidable along an axis of the bore;

directing the fluid input from the input port through the first passage into the bore, wherein directing the fluid input from the input port through the first passage into the bore comprises directing a portion of the fluid input through the grooves;

blocking a flow of the fluid input to a second passage coupled to an output port when the valve spool is in a closed position, the second passage being offset from the first passage and locate on an opposite side of the axis of the bore, the closed position comprising a first end of the valve spool substantially situated within a first cavity open to the bore of the valve body and a sealing region of a second end of the valve spool in sealing contact with the bore substantially situated between the fluid input and the second passage, wherein the second end of the valve spool is coupled to the first end via a reduced-section region of the valve spool;

applying a momentary load from a valve actuator arrangement comprising at least one solenoid to the valve spool to slide the valve spool to an open position, the open position comprising the second end of the valve spool substantially situated within a second cavity open to the bore of the valve body such that the reduced-section region of the valve spool permits a flow of the fluid input to the second passage;

transferring a portion of an internal fluid between the first cavity and the second cavity via a connecting passage when sliding the valve spool from the closed position to the open position; and directing the fluid input from the bore through the second passage into the output port;

wherein the valve spool comprises a first detent groove located at the first end and a second detent groove located at the second end, wherein the valve body comprises a first detent member holder located at a first end thereof and a second detent member holder located at a second end thereof, wherein a first detent member and a second detent member are located in the first and the second detent member holders respectively, wherein the first detent member is configured to engage the first detent groove when the valve spool is in an open position, wherein the second detent member is configured to engage the second detent groove when the valve spool is in closed position, wherein each of the first detent member and the second detent member comprises at least one ball that engage the first detent groove and the second detent groove respectively, wherein at least one of the first detent member holder and the second detent member holder comprises a sealable opening, and wherein the sealable opening is configured to change a volume of the internal fluid in the first and second cavities.

* * * * *